(12) United States Patent
Yoo et al.

(10) Patent No.: US 8,076,875 B2
(45) Date of Patent: Dec. 13, 2011

(54) SWITCHED RELUCTANCE MOTOR AND CONNECTION METHOD FOR SENSOR SHUTTER THEREOF

(75) Inventors: Myung-Keun Yoo, Seoul (KR); Jun-Young Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 363 days.

(21) Appl. No.: 12/441,999

(22) PCT Filed: Sep. 19, 2007

(86) PCT No.: PCT/KR2007/004562
§ 371 (c)(1),
(2), (4) Date: Mar. 19, 2009

(87) PCT Pub. No.: WO2008/035919
PCT Pub. Date: Mar. 27, 2008

(65) Prior Publication Data
US 2009/0267548 A1    Oct. 29, 2009

(30) Foreign Application Priority Data
Sep. 21, 2006   (KR) .................. 10-2006-0091997

(51) Int. Cl.
*H02P 25/08* (2006.01)
(52) U.S. Cl. ............................................. 318/254.1
(58) Field of Classification Search .......... 318/254.1, 318/400.4, 701; 310/68 B, 261; 73/474, 73/514.39; 324/175
See application file for complete search history.

(56) References Cited

U.S. PATENT DOCUMENTS

| | | | | |
|---|---|---|---|---|
| 5,786,646 A | * | 7/1998 | Newberg et al. | 310/68 B |
| 5,831,358 A | * | 11/1998 | Bobay | 310/58 |
| 5,877,568 A | * | 3/1999 | Maes et al. | 310/68 B |
| 6,989,668 B2 | * | 1/2006 | Mayes | 318/254.1 |
| 2008/0284368 A1 | * | 11/2008 | Kim et al. | 318/701 |

FOREIGN PATENT DOCUMENTS

| | | |
|---|---|---|
| KR | 10-2000-0048648 | 7/2000 |
| KR | 10-2000-0048792 | 7/2000 |
| KR | 10-2004-0029618 | 4/2004 |
| KR | 10-2006-0097264 | 9/2006 |

OTHER PUBLICATIONS

International Search Report dated Jan. 15, 2008.

* cited by examiner

*Primary Examiner* — Thomas Dougherty
(74) *Attorney, Agent, or Firm* — Ked & Associates LLP

(57) ABSTRACT

The present invention relates to a switched reluctance motor and a connection method for a sensor shutter thereof. The switched reluctance motor in accordance with the present invention includes a stator; a rotor rotating with respect to the stator centering around a rotational shaft; and a sensor shutter having a sensing part through which a light can be passed and connected to an end portion of the rotational shaft, and a stopping ring is connected to the end portion of the rotational shaft so as to prevent the sensor shutter from being separated. Accordingly, the sensor shutter can be quickly and easily connected and the length of the rotational shaft can be decreased.

15 Claims, 8 Drawing Sheets

SWITCHED RELUCTANCE MOTOR AND CONNECTION METHOD FOR SENSOR SHUTTER THEREOF

TECHNICAL FIELD

The present invention relates to a switched reluctance motor, and more particularly, to a switched reluctance motor which is capable of easily connecting a sensor shutter and of decreasing a length thereof in an axial line direction, and a connection method for the sensor shutter thereof.

BACKGROUND ART

As known, the switched reluctance motor rotates a rotor by using a reluctance torque according to a change in the magnetic reluctance and has advantages in that its fabrication cost is low, it does not need much maintenance and has such high reliability that its life span is substantially permanent.

FIG. 1 is a sectional view of the related art switched reluctance motor, and FIG. 2 is a sectional view taken along line II-II in FIG. 1. As shown in the drawings, the switched reluctance motor includes a housing 11, a stator 21 fixed within the housing 11, a rotor 31 rotatably disposed with respect to the stator 21, and a rotor position detecting unit 41 that detects a rotational position of the rotor 31.

A plurality of through holes 13 are formed at side portions of the housing 11 to allow the interior and exterior to communicate with each other, and a stator 21 is fixedly disposed within the housing 11. The rotor 31 is installed to be rotatable centering around a rotational shaft 33 within the stator 21. The rotational shaft 33 is rotatably supported by a bearing 35 fixed at the housing 11.

Meanwhile, the rotor position detecting unit 41 includes a sensor disk 43 integrally and rotatably connected to the rotational shaft 33, and a sensor unit 51 interworks with the sensor disk 43 to detect a rotational position of the rotor 31.

The sensor disk 43 has a disk shape and includes a plurality of protrusions 45 formed to be outwardly protruded in a radial direction at the circumference thereof. A support member 47 is connected at one side of the sensor disk 43 and connected to the rotational shaft 33 to support the sensor disk 43.

The sensor unit 51 includes a plurality of PCBs 53, a PCB fixing member 55 for fixing the PCBs 53 at the housing 11, and a photo-interruptor 57 having a light emitting part 58 and a light receiving part 59 that are disposed to be spaced apart with the protrusions 45 of the sensor disk 43 interposed therebetween in the axial line direction at one side of each PCB 53. Here, the PCBs 53 and the photo-interruptors 57 are provided by the number corresponding to each phase (three-phase) of a coil of the stator 21 and connected at each pre-set position.

The related art switched reluctance motor has the following problems. That is, because the sensor unit 51 is connected in the through holes 13 formed at the lateral portion of the housing 11, the stator 21 needs to be precisely inserted within the housing 11 in consideration of the position of the sensor unit 51 during assembling, so much attention and time are required for the assembling of the stator 21.

In addition, as in case used for a motor of a vacuum cleaner, because the light emitting part 58 and the light receiving part 59 are disposed within the housing 11 in which temperature is relatively high and there is much dust, the life span and sensitivity of the light emitting part 58 and the light receiving part 59 are negatively affected.

In addition, because the sensor disk 43 is connected to the support member 47 by using a screw or the like, time duration for assembling is extended, and the length of the rotational shaft 33 and the size of the housing are increased, thereby being disadvantageous in a compact configuration.

DISCLOSURE OF THE INVENTION

Technical Problem

Therefore, one object of the present invention is to provide a switched reluctance motor which is capable of quickly and easily connecting a sensor shutter and of decreasing a length of a rotational shaft thereof, and a connection method for the sensor shutter thereof.

Another object of the present invention is to provide a switched reluctance motor which is capable of firmly fixing a sensor shutter to a rotational shaft and a connection method for the sensor shutter thereof.

Technical Solution

To achieve these and other advantages and in accordance with an aspect of the present invention, there is provided a switched reluctance motor comprising: a stator; a rotor rotating with respect to the stator centering around a rotational shaft; a sensor shutter having a sensing part through which a light can be passed and connected to an end portion of the rotational shaft; a stopping ring connected to the end portion of the rotational shaft so as to prevent the sensor shutter from being separated.

Here, a sensor shutter connecting unit that is reduced in a radial direction to allow the sensor shutter to be connected to is formed at the end portion of the rotational shaft, and the stopping ring may be connected to the sensor shutter connecting unit.

Further, a concave-convex part may be formed at the sensor shutter connecting unit to prevent an gap in an axial line direction of the stopping ring.

Preferably, a shaft hole is formed at the sensor disk to allow the sensor shutter connecting unit to be inserted into, and a rotation restraining part that restrains a relative rotation is formed at the sensor shutter connecting unit and the shaft hole.

The rotation restraining part may comprise protrusions protruding at an inner side of the shaft hole in the radial direction, and protrusion receiving recesses formed at the sensor shutter connecting unit to receive the protrusions.

Here, the protrusions may be formed by making a pair.

Meanwhile, in accordance with another aspect of the present invention, there is provided a switched reluctance motor comprising: a stator; a rotor rotating with respect to the stator centering around a rotational shaft; a sensor shutter having a sensing part through which a light can be passed and connected to the rotational shaft with a pre-set assembling position; and a rib connected to the sensor shutter and then curved at the end portion of the rotational shaft so as to prevent the sensor shutter from being separated.

Here, a concave-convex part may be formed at the end portion of the rotational shaft connected to the sensor shutter in a circumferential direction.

A shaft hole penetrated to insert the end portion of the rotational shaft may be formed at the sensor shutter, and a rotation restraining part may be formed at the end portion of the shaft hole and the rotational shaft so as to restrain a relative rotation.

The rotation restraining part may comprise protrusions protruding at any one of the end portion of the rotational shaft and the shaft hole toward another one, and protrusion receiving recesses formed at another one to receive the protrusions.

Preferably, the rib is formed in plural spaced from each other by intervals for inserting the protrusions in the axial line direction.

Meanwhile, in accordance with still another aspect of the present invention, there is provided a connection method for a sensor shutter of a switched reluctance motor in which the sensor shutter having a sensing area passing a light and a shaft hole at a center thereof is connected to one end portion of a rotational shaft of a rotor, the connection method comprising: forming a rib at the one end portion of the rotational shaft to be protruded in an axial line direction; connecting the rotational shaft to the sensor shutter so as for the rib to pass through the shaft hole; and fixing the sensor shutter by curving the rib.

Here, prior to the step of connecting the rotational shaft to the sensor shutter, it may further comprise forming a concave-convex part at an outer surface of the rotational shaft to which the sensor shutter is connected in a circumferential direction.

Effect of the Invention

As aforementioned in detail, in accordance with the present invention, because the stopping ring is connected or the rib is curved after the connection of the sensor shutter, the sensor shutter can be quickly and easily connected, besides, because a screw connecting means, such as a screw, a bolt, a nut or the like, which relatively spends much time on connecting and needs a relatively long length of the axial line, is not used, the length of the rotational shaft can be decreased and the size of the motor with respect to the axial line direction can be smaller overall.

Further, in accordance with the present invention, the sensor shutter can be firmly fixed to the rotational shaft and there is no concern to be loosen by vibrations while rotating, accordingly enabling the reliability of an apparatus to be enhanced.

Further, in accordance with the present invention, because air flows into the housing in the axial line direction of the motor, the temperature is relatively high, and the sensor disk and the sensor can be installed by being separated from the inside of a motor housing having dust or the like, thereby being capable of preventing the sensor from being negatively affected by the temperature and the dust, and of reducing the size of the motor housing.

MODES FOR CARRYING OUT THE PREFERRED EMBODIMENTS

Hereinafter, the present invention will be described in detail with reference to accompanying drawings.

Figure 1:
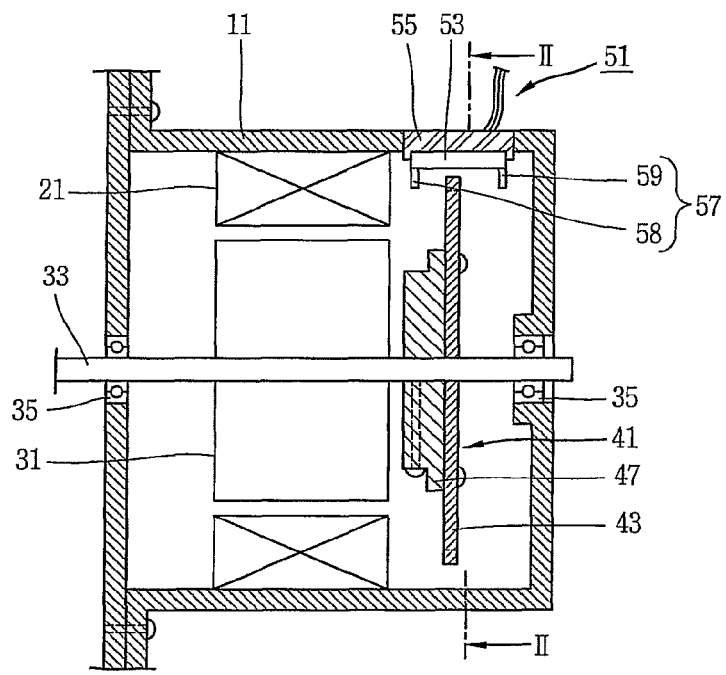
FIG. 1 is a sectional view showing a related art switched reluctance motor.
Figure 2:
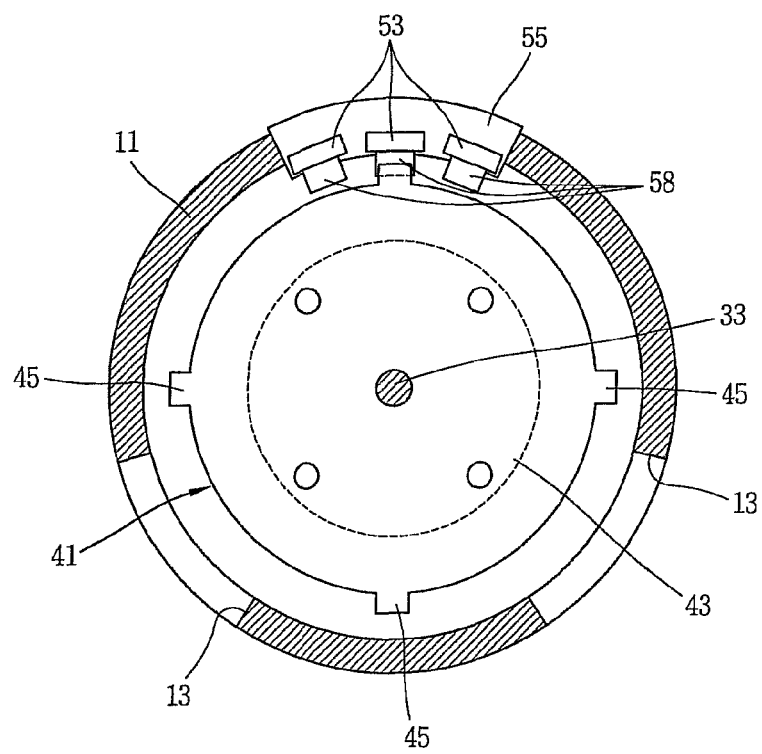
FIG. 2 is a sectional view taken along line II-II in FIG. 1.
Figure 3:
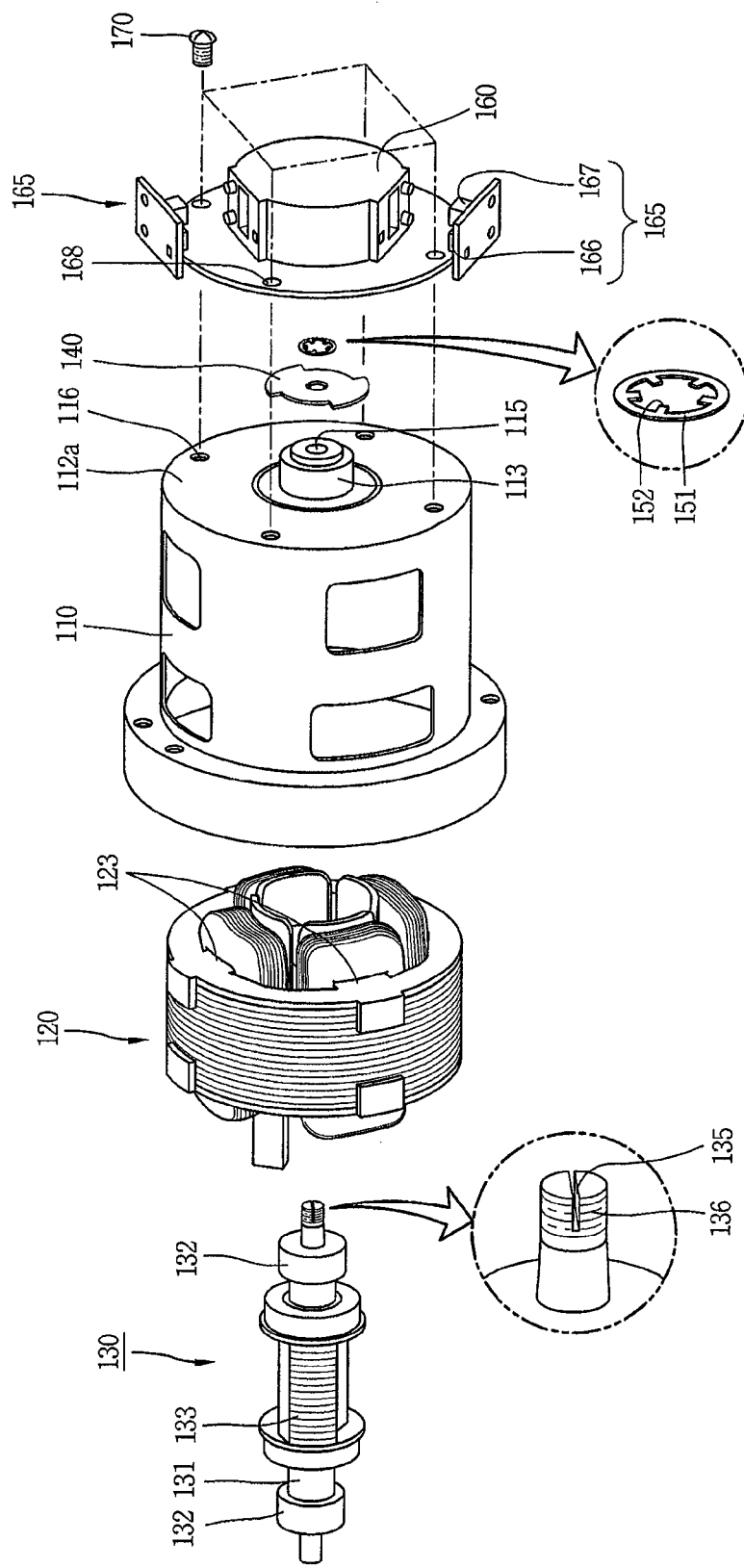
FIG. 3 is an exploded perspective view showing a switched reluctance motor in accordance with a first embodiment of the present invention.
Figure 5:
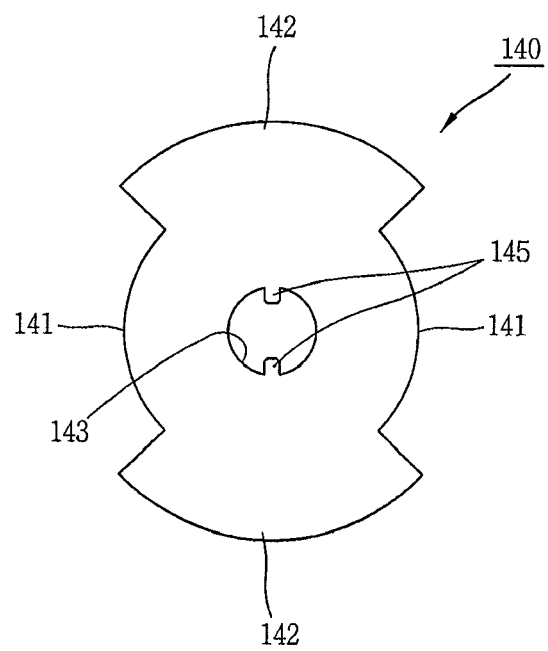
FIG. 5 is a front perspective view showing a sensor shutter in FIG. 3.
Figure 6:
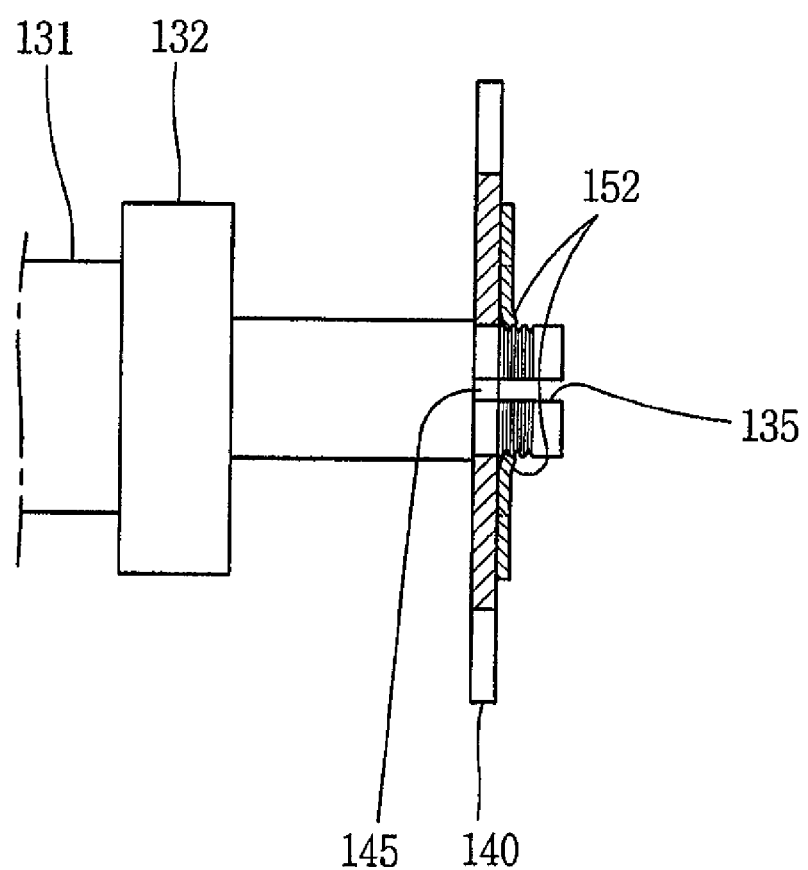
FIG. 6 is a sectional view showing a connected state of the sensor shutter in FIG. 3.

As shown in FIG. 3, the switched reluctance motor includes: a stator 120; a rotor 130 rotating with respect to the stator 120 centering around a rotational shaft 131; a sensor shutter 140 having a sensing part 141, as shown in FIG. 5, through which a light can be passed and connected to an end portion of the rotational shaft 131; a stopping ring 151 connected to the end portion of the rotational shaft 131 so as to prevent the sensor shutter 140 from being separated.

The stator 120 is provided with a plurality of salient poles 123 therein, and the rotor 130 is provided with salient poles 133 formed to be outwardly protruded in a radial direction so as to be rotatably connected to an interior of the stator 120 centering around the rotational shaft 131. A pair of bearings 132 are connected to the rotational shaft 131.

The stator 120 and the rotor 130 are receivedly installed inside of a motor housing 110 having the interior formed in a receiving space having one opened side, and a bearing connecting unit 113 to allow the bearings 132 to be connected to is formed at a closed end 112a of the motor housing 110. A shaft hole 115 is formed at the bearing connecting unit 113 so that the end portion of the rotational shaft 131 can be exposed outwardly.

Meanwhile, the sensor shutter 140, as shown in FIG. 5, is provided with sensing parts 141 and blocking parts 142 which have the different length in the radial direction so that light can be passed through or blocked, and the shaft hole 143 is formed at a central area thereof so as to insert the rotational shaft 131. Protrusions 145 are protrudingly formed inside of the shaft hole 143 so as to be integrally rotated with the rotational shaft 131 when connecting to the rotational shaft 131.

Figure 4:
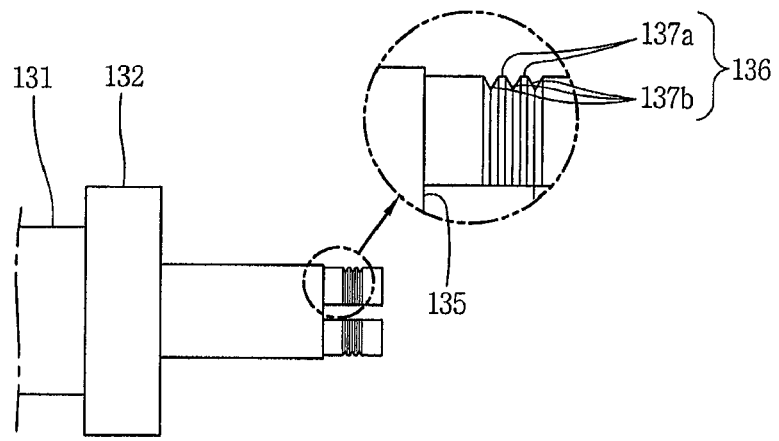
FIG. 4 is an enlarged sectional view showing an end portion of a rotational shaft in FIG. 3.

At the end portion of the rotational shaft 131, as shown in FIG. 4, recesses 135 cut in a diameter direction are formed to insert the protrusions 145 when connecting the sensor shutter 140. Here, the outer surface of the end portion of the rotational shaft 131 may be cut to be flattened and the shaft hole of the sensor shutter 140 may be formed to correspond to a shape of a cross section of the rotational shaft 131. A stopping ring 151 is coupled to one side of the sensor shutter 140 so as to prevent the sensor shutter 140 from being separated.

The stopping ring 151 has a ring shape, and is provided with a plurality of protrusions 152 inwardly protruded at inner surface thereof. Here, it is preferable that the stopping ring 151 is formed in a circular shape to attenuate a generation of vibrations, because a large vibration can be generated by a small vibration generating element when the rotor 130 rotates in a high speed (for example, approximately 30000 rpm to 80000 rpm).

As shown in FIG. 4, a concave-convex part 136 having a cross section of which top parts 137a and bottom parts 137b are alternately disposed in the axial line direction is formed at the outer surface of the rotational shaft 131 so as to prevent the stopping ring 151 from being separated by engaging with the protrusions 152 of the stopping ring 151.

A sensor housing 160 is connected to the closed end 112a of the motor housing 110 so as to receive the sensor shutter 140 therein. A female screw part 116 is formed at the motor housing 110 so that a connecting member 170 such as a screw, or the like can be connected, and a through hole 168 is formed at the sensor housing 160 so that the connecting member 170 can pass through. Sensors 165 having a light emitting part 166 and a light receiving part 167 which are spaced apart with the sensor shutter 140 interposed therebetween in the axial line direction is disposed at the sensor housing 160.

With such configuration, when the stator 120 and the rotor 130 are connected in the motor housing 110, the end portion of the rotational shaft 131 is exposed outwardly through the shaft hole 115. The sensor shutter 140 is connected to the rotational shaft 131 so as to insert the protrusions 145 into the recesses 135 of the rotational shaft 131, and a stopping ring 151 is connected to the concave-convex part 136 so that the sensor shutter 140 can be prevented from separating and be fixed. After the stopping ring 151 is connected, the sensor housing 160 is connected to the end portion of the motor housing 110, and the sensors 165 are connected to the corresponding positions of the sensor housing 160, respectively.

Figure 7:
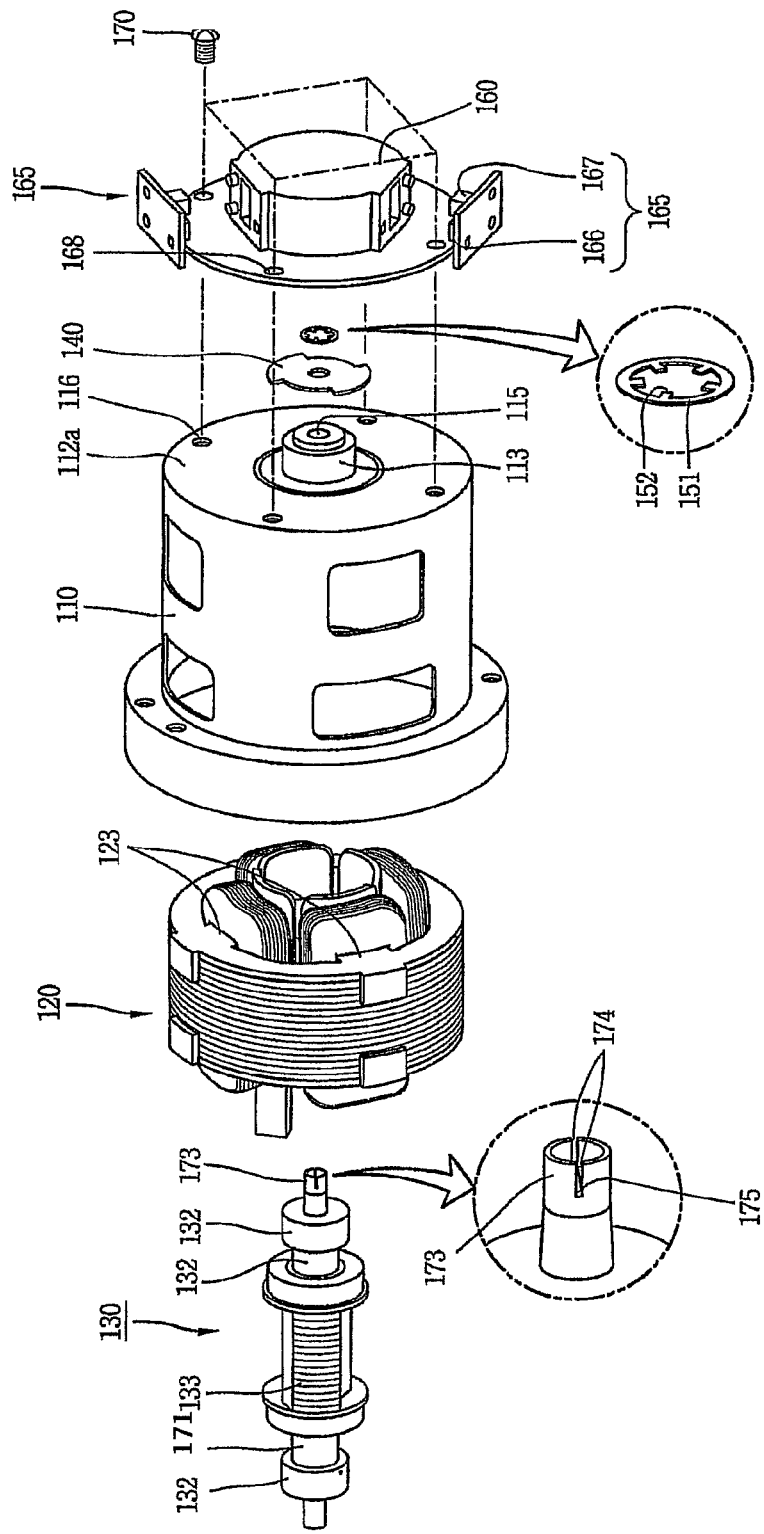
FIG. 7 is an exploded perspective view showing a switched reluctance motor in accordance with a second embodiment of the present invention.

Hereinafter, the switched reluctance motor in accordance with a second embodiment of the present invention will be described with reference to FIGS. 7 to 13. The same or equivalent features with aforementioned description are referenced by the same numerals for convenient description of the drawings, and the detailed description will be omitted. As shown in FIG. 7, the switched reluctance motor includes: the stator 120; the rotor 130 rotating with respect to the stator centering around a rotational shaft 171; a sensor shutter 140 having a sensing part 141 through which a light can be passed and connected to the rotational shaft 171 with a pre-set assembling position; a rib 173 connected to the sensor shutter 140 and then curved at the end portion of the rotational shaft 171 so as to prevent the sensor shutter 140 from being separated.

The stator 120 is provided with the plurality of salient poles 123 therein, and the rotor 130 is provided with salient poles 133 formed to be outwardly protruded in the radial direction so as to be rotatably connected to the interior of the stator 120 centering around the rotational shaft 171. The pair of bearings 132 are connected to the rotational shaft 171.

The stator 120 and the rotor 130 are receivedly installed inside of the motor housing 110 having the interior formed in the receiving space having one opened side, and the bearing connecting unit 113 provided with the shaft hole 115 is formed at the closed end 112a of the motor housing 110 so that the bearings 132 is connected thereto and the end portion of the rotational shaft 171 can be exposed.

The sensor shutter 140 is provided with the sensing parts 141 and the blocking parts 142, and the shaft hole 143 is formed at the central area thereof. The protrusions 145 are protrudingly formed inside of the shaft hole 143 so as to be integrally rotated with the rotational shaft 171 when connecting to the rotational shaft 171.

Figure 8:
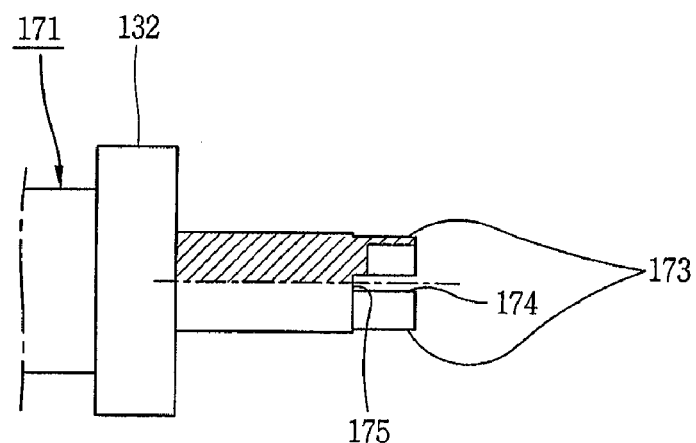
FIG. 8 is a sectional view partially showing a rotational shaft in FIG. 7.
Figure 11:
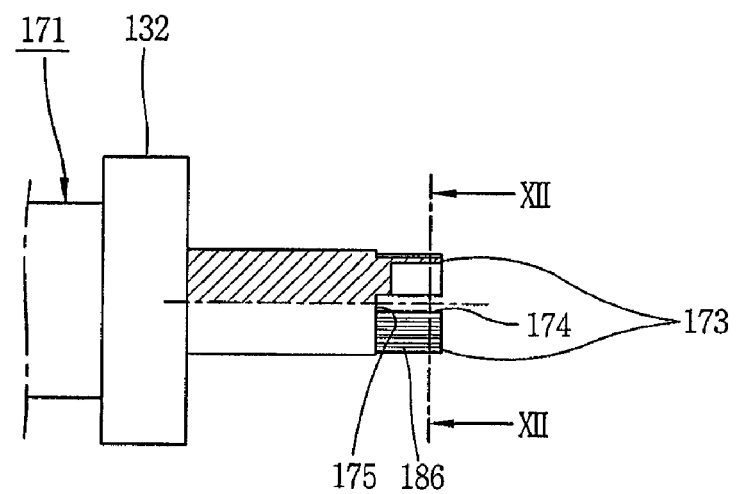
FIG. 11 shows a modified example of the rotational shaft in FIG. 7.
Figure 12:
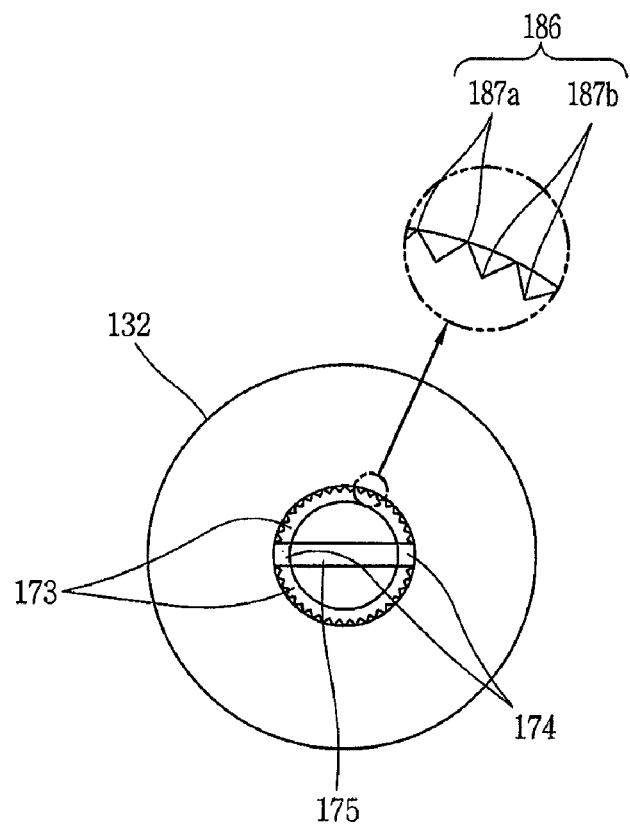
FIG. 12 is a sectional view taken along line XII-XII in FIG. 11.

Meanwhile, at the end portion of the rotational shaft 171, as shown in FIGS. 7 and 8, a pair of ribs 173 which are curved to contact the surface of the sensor shutter 140 is formed at the end portion of the rotational shaft 171 so as to prevent the sensor shutter 140 from being separated after the connection of the sensor shutter 140. The ribs 173 are formed to have an arch shape and be spaced apart in insertion intervals 174 of the protrusions 145. Recesses 175 cut in the diameter direction are formed at the end portion of the rotational shaft 171 so that the protrusions 145 can be respectively received when connecting the sensor shutter 140. Here, at the outer surface of the rotational shaft 171, as shown in FIGS. 11 and 12, a concave-convex part 186 having the cross section of which top parts 187a and bottom parts 187b are alternately disposed in a circumferential direction is formed, which is preferable to increase a connecting force of the sensor shutter 140.

With such configuration, when the stator 120 and the rotor 130 are connected in the motor housing 110, the end portion of the rotational shaft 171 is exposed outwardly through the shaft hole 115. After inserting the protrusions 145 of the sensor shutter 140 into the intervals 174 between the ribs 173, the sensor shutter 140 is moved in the axial line direction so that the protrusions 145 are inserted into the recesses 175.

Figure 9:
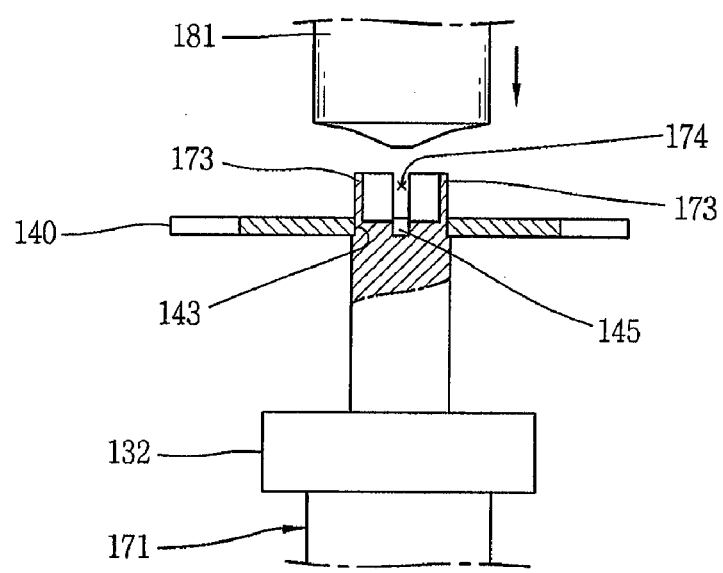
FIGS. 9 and 10 are diagrams showing a curving process of a rib of the rotational shaft in FIG. 7, respectively.
Figure 10:
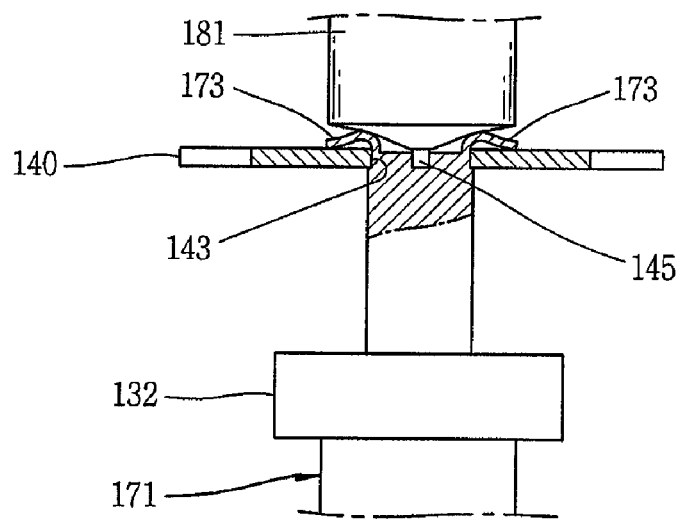
Figure 13:
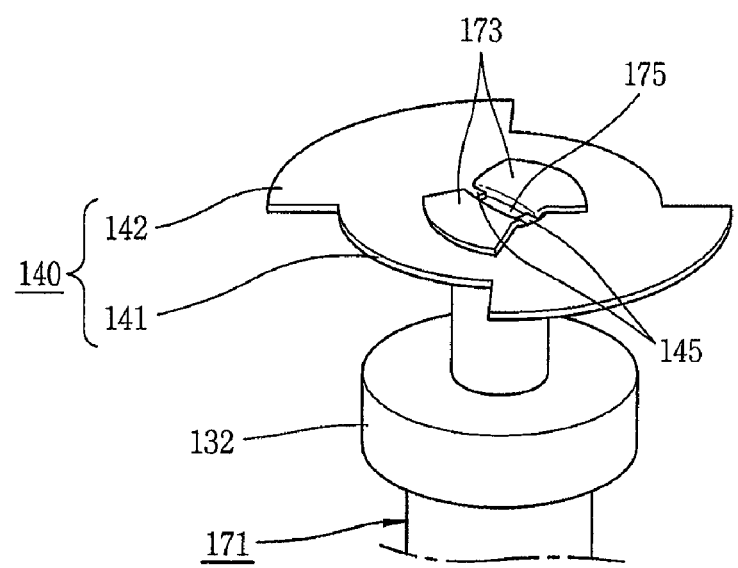
FIG. 13 is a perspective view showing a sensor shutter after a connection in FIG. 7.

Then, as shown in FIGS. 9 and 10, a tool 181 having an inclined end portion is disposed at the end portion side of the rib 173, and the rib 173 is pressed in the axial line direction. When the rib 173 is pressed by the tool 181, the rib 173 is curved adjacent to the sensor shutter 140 and outwardly split. As shown in FIG. 13, after the pressing, the rib 173 undergoes a plastic deformation to be adhered on the surface of the sensor shutter 140, accordingly preventing the sensor shutter 140 from being separated. Meanwhile, when curving of the rib 173 is completed, the sensor housing 160 is connected thereto, and the sensors 165 are respectively connected to the positions pre-set for the sensor housing 160.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A switched reluctance motor, comprising:
a stator;
a rotor that rotates with respect to the stator centering around a rotational shaft;
a sensor shutter that includes at least one sensing part through which a light passes, the sensor shutter being attached to an end portion of the rotational shaft;
a stopping ringer attached to the end portion of the rotational shaft so as to prevent the sensor shutter from being separated from the rotational shaft, wherein a sensor shutter connector is formed at the end portion of the rotational shaft, the sensor shutter connector reducing in a radial direction to allow the sensor shutter to be attached to the end portion of the rotational shaft, wherein the stopping ring is attached to the sensor shutter connector, and wherein a concave-convex part is formed at the sensor shutter connector to prevent a gap in an axial direction of the stopping ring.

2. The switched reluctance motor of claim 1, wherein the sensor shutter includes a shaft hole to allow the sensor shutter connector to be inserted therein, and wherein a rotation restraining part that restrains a relative rotation is formed at the sensor shutter connector and the shaft hole.

3. The switched reluctance motor of claim 2, wherein the rotation restraining part comprises a plurality of protrusions that protrude inward from an inner side of the shaft hole in a radial direction, and a plurality of protrusion receiving recesses formed at the sensor shutter connector to receive the plurality of protrusions.

4. The switched reluctance motor of claim 3, wherein the plurality of protrusions are formed by making a pair of protrusions.

5. A switched reluctance motor, comprising:
a stator;
a rotor to rotate with respect to the stator centering around a rotational shaft;
a sensor shutter having a sensing part through which a light passes, and the sensor shutter being connected to the rotational shaft with a pre-set assembling position;
a rib connected to the sensor shutter, the rib being curved at an end portion of the rotational shaft so as to prevent the sensor shutter from being separated from the rotational shaft.

6. The switched reluctance motor of claim 5, wherein a concave-convex part is formed at the end portion of the rotational shaft connected to the sensor shutter in a circumferential direction.

7. The switched reluctance motor of claim 5, wherein the sensor shutter includes a shaft hole to receive the end portion of the rotational shaft, and a rotation restraining part is formed at the end portion of the rotational shaft and the shaft hole so as to restrain a relative rotation of the sensor shutter.

8. The switched reluctance motor of claim 7, wherein the rotation restraining part comprises a plurality of protrusions that protrude at one of the end portion of the rotational shaft and the shaft hole toward the other one of the rotational shaft and the shaft hole, and a plurality of protrusion receiving recesses formed at the other one of the rotational shaft and the shaft hole to receive the protrusions.

9. The switched reluctance motor of claim 8, wherein the rib is formed in plurality spaced from each other by intervals for inserting the protrusions in the axial line direction.

10. The switched reluctance motor of claim 5, wherein the rib has a cross section which is an arch shape.

11. A connection method for a sensor shutter of a switched reluctance motor in which the sensor shutter has a sensing area for passing a light and a shaft hole at a center thereof, and the sensor shutter is connected to an end portion of a rotational shaft of a rotor, the connection method comprising:
forming a rib at the end portion of the rotational shaft to protrude in an axial line direction;
connecting the rotational shaft to the sensor shutter so the rib passes through the shaft hole; and
attaching the sensor shutter by curving the rib.

12. The connection method of claim 11, prior to the connecting the rotational shaft to the sensor shutter, the method further comprises forming a concave-convex part at an outer surface of the rotational shaft to which the sensor shutter is connected in a circumferential direction.

13. A switched reluctance motor, comprising:
a stator;
a rotor that rotates with respect to the stator centering around a rotational shaft;
a sensor shutter that includes at least one sensing part through which a light passes, the sensor shutter being attached to an end portion of the rotational shaft;
a stopping ring attached to the end portion of the rotational shaft so as to prevent the sensor shutter from being separated from the rotational shaft, wherein a sensor shutter connector is formed at the end portion of the rotational shaft, the sensor shutter connector to reduce in a radial direction to allow the sensor shutter to be attached to the end portion of the rotational shaft, wherein the stopping ring is attached to the sensor shutter connector,
wherein the sensor shutter includes a shaft hole to allow the sensor shutter connector to be inserted therein,
wherein a rotation restraining part is formed at the sensor shutter connector and the shaft hole to restrain rotation, and wherein the rotation restraining part includes a plurality of protrusions that inwardly protrude from an inner side of the shaft hole in a radial direction, and a plurality of protrusion receiving recesses formed at the sensor shutter connector to receive the plurality of protrusions.

14. The switched reluctance motor of claim 13, wherein the sensor shutter connector includes a concave-convex part to prevent a gap in an axial direction of the stopping ring.

15. The switched reluctance motor of claim 13, wherein the plurality of protrusions are formed by making a pair of protrusions.

* * * * *